United States Patent
Herrmann et al.

(10) Patent No.: US 7,260,199 B2
(45) Date of Patent: Aug. 21, 2007

(54) METHOD FOR MANAGING AT LEAST ONE CAPABILITY CHARACTERISTIC OF A SWITCHING SYSTEM OF A TELECOMMUNICATION NETWORK

(75) Inventors: Herbert Herrmann, Germering (DE); Jürgen Lantermann, München (DE)

(73) Assignee: Siemens Aktiengesellschaft, Munich (DE)

( * ) Notice: Subject to any disclaimer, the term of this patent is extended or adjusted under 35 U.S.C. 154(b) by 636 days.

(21) Appl. No.: 10/450,144

(22) PCT Filed: Dec. 5, 2001

(86) PCT No.: PCT/DE01/04581

§ 371 (c)(1),
(2), (4) Date: Nov. 7, 2003

(87) PCT Pub. No.: WO02/49371

PCT Pub. Date: Jun. 20, 2002

(65) Prior Publication Data

US 2004/0071279 A1 Apr. 15, 2004

(30) Foreign Application Priority Data

Dec. 14, 2000 (DE) .................... 100 62 288

(51) Int. Cl.
*H04M 3/42* (2006.01)
*H04M 3/47* (2006.01)
(52) U.S. Cl. .............................. 379/201.12; 379/201.01
(58) Field of Classification Search ........... 379/201.12, 379/201.01, 201.02, 204.01
See application file for complete search history.

(56) References Cited

U.S. PATENT DOCUMENTS 6,011,837 A * 1/2000 Malik ...................... 379/114.1

* cited by examiner

*Primary Examiner*—William J. Deane, Jr.
(74) *Attorney, Agent, or Firm*—Bell Boyd & Lloyd LLP

(57) ABSTRACT

The invention relates to a method and device for managing at least one capability characteristic (F1, F2, F3), which is subject to license or for managing at least one group (G1, G2, G3) of capability characteristics (F1, F2, F3), which are subject to license, of a switching system of a telecommunications network. According to the invention, at least one use counter (C, E1, E2) at a time is assigned to the at least one capability characteristic (F1, F2, F3) and/or to the at least one group (G1, G2, G3) of capability characteristics (F1, F2, F3). Said use counter indicates the current number of uses of the capability characteristic (F1, F2, F3) or of the group (G1, G2, G3) of capability characteristics (F1, F2, F3). A typical use of the invention involves the sharing of a switching system by an number of service providers.

16 Claims, 2 Drawing Sheets

| | A | B | C | $D_1$ | $E_1$ | $D_2$ | $E_2$ |
|---|---|---|---|---|---|---|---|
| $F_1$ | 60.000 | 55.000 | 15.500 | 10.000 | 10.000 | 10.000 | 5500 |
| $F_2$ | 60.000 | 60.000 | 60.000 | 30.000 | 30.000 | 30.000 | 30.000 |
| $F_3$ | 50.000 | 40.000 | 30.000 | 20.000 | 20.000 | 15.000 | 10.000 |
| G1 | 60.000 | 60.000 | 60.000 | 30.000 | 30.000 | 30.000 | 30.000 |
| G2 | 60.000 | 55.000 | 15.500 | 10.000 | 10.000 | 10.000 | 5500 |
| G3 | 60.000 | 55.000 | 15.500 | 10.000 | 10.000 | 10.000 | 5500 |
| . | | | | | | | |
| . | | | | | | | |

| TAB1 | A | C | D₁ | E₁ | D₂ | E₂ |
|---|---|---|---|---|---|---|
| F₁ | 60.000 | 15.500 | 10.000 | 10.000 | 10.000 | 5500 |
| F₂ | 60.000 | 60.000 | 30.000 | 30.000 | 30.000 | 30.000 |
| F₃ | 50.000 | 30.000 | 20.000 | 20.000 | 15.000 | 10.000 |
| G1 | 60.000 | 60.000 | 30.000 | 30.000 | 30.000 | 30.000 |
| G2 | 50.000 | 30.000 | 20.000 | 20.000 | 15.000 | 10.000 |
| G3 | 60.000 | 15.500 | 10.000 | 10.000 | 10.000 | 5500 |
| . | | | | | | |
| . | | | | | | |

METHOD FOR MANAGING AT LEAST ONE CAPABILITY CHARACTERISTIC OF A SWITCHING SYSTEM OF A TELECOMMUNICATION NETWORK

CLAIM FOR PRIORITY

This application claims priority International Application No. PCT/DE01/04581 which was published in the German language on Jun. 20, 2002.

TECHNICAL FIELD OF THE INVENTION

The invention relates to a method for managing at least one capability characteristic which is subject to a license or a least one group of capability characteristics which is subject to a license of a switching system of a telecommunications network.

The invention also relates to a switching system of a telecommunications network, whereby in the switching system at least one capability characteristic which is subject to a license and/or at least one group of capability characteristics which is subject to a license are implemented and the switching system is arranged so that at least one capability characteristic which is subject to a license and/or at least one group of capability characteristics subject to a license can be managed.

BACKGROUND OF THE INVENTION

The manufacturers of switching systems wishing to supply and sell their systems worldwide must arrange their systems so that they can be flexibly adapted to customer-specific special requirements. Such adaptations are, for example, necessary to adapt the switching systems optimally to the network hierarchies of different network operators and enable them to be parameterized for different specific tasks. Often it is also necessary to adapt the exchanges to different national network signaling systems. Above and beyond this, exchange operators often have different ideas and requirements with regard to the capability characteristics that they want to offer their subscribers.

For the reasons just mentioned, well known switching systems, for example the EWSD and SURPASS switching systems from Siemens AG, are structured so that they are easily adaptable to special features or to special requirements. These switching systems are specially arranged in their software for this purpose and contain at least a greater number of capability characteristics than the network providers wish to offer their customers.

Capability characteristics in this document are taken to mean network capability characteristics and subscriber capability characteristics.

Network capability characteristics are, for example, the dynamic thinning out of traffic for mass calls, such as for tele-dialog surveys, known as TED surveys for short. TED surveys make it possible for radio listeners or TV viewers to take part in opinion polls by telephone, which can then be immediately analyzed. With TED surveys, the caller reaches a special directory number via a uniform prefix number that corresponds to their desired option. To prevent network overloading during TED surveys, the calls are no longer submitted to the TED destination address after a pre-specified number of TED calls is reached.

Another example for a network capability characteristic is the blocking of specific destinations on network overload.

Subscriber capability characteristics are taken to mean functionalities that can be made available to telecommunications terminals from the switching systems side. These capability characteristics can be service-independent and offer additional functions which, for example, facilitate and simplify the operation of the terminal. Subscriber capability characteristics can also add to service features. For telephones transfer, automatic ring-back or call forwarding represent capability characteristics.

Naturally, it is not in the interest of the switching system manufacturers to enable the network providers to use all capability characteristics and combinations of capability characteristics unless they buy or obtain a license to use these capability characteristics.

Thus, it is desirable on the part of the switching system manufacturer either only to enable the capability characteristics available in the relevant switching system in accordance with a negotiated license scope or to enable all capability characteristics and to apply license fees in accordance with their actual usage.

With switching systems reseller characteristics can also be supported. This function allows a number of network operators to share a switching facility and enables them to supply their relevant subscribers individually with capability characteristics. Here too it is desirable that either type and scope of the usable capability characteristics can be restricted by the switching system operator in to his various network operators in accordance with the license scope negotiated or that the capability characteristics that are implemented in the switching system are enabled and license fees are charged in accordance with their actual use.

SUMMARY OF THE INVENTION

It is an object of the invention to create a way that allows the use volumes subject to a license of the capability characteristics implemented in a switching system to be optimally adapted to practical requirements and thus to increase the cost effectiveness of the switching system.

According to one aspect of the invention, at least one capability characteristic subject to a license and/or at least one group of capability characteristics subject to a license are each assigned at least one use counter which specifies the current number of uses of the capability characteristic or of the group of capability characteristics.

This solution allows a switching systems manufacturer to concurrently monitor licenses of all capability characteristics which is subject to a license.

If there is no intention on the part of the manufacturer to enable all capability characteristics on an restricted basis, an advantageous variant of the invention consists of the use counter being compared with at least one threshold value, and when this threshold value is exceeded by the use counter, no further uses of this capability characteristic and/or group of capability characteristics being allowed.

It is also of advantage if the threshold value is compared with a capacity value which specifies the physically maximum possible number of uses of the capability characteristic and/or the group of capability characteristics in the switching system.

According to another aspect of the invention, the current value of the use counter and/or information on the capability characteristic assigned to the use counter and/or the group of capability characteristics assigned to the use counter within the switching system is created in the form of data.

If the capability characteristic is released on an unrestricted basis, license monitoring using periodic spot checks can be implemented; this is done by buffering the data within the switching system at specified intervals.

According to a further aspect of the invention, a data table is created from the data. For further evaluation by the manufacturer or exchange operator, the data can be dumped to an external storage medium.

Another option of transferring the data to the manufacturer or to the exchange operator comprises exchanging the dump to data between the switching system and a telecommunications terminal via a data link.

To implement the method in accordance with the invention a switching system of the type mentioned at the beginning is particularly suitable in which at least one capability characteristic subject to a license and/or at least one group of capability characteristics subject to a license are each assigned at least one use counter in the exchange which specifies the current number of uses of at least one capability characteristic subject to a license and/or at least one a group of capability characteristics subject to a license.

With concurrent license monitoring it is useful for the switching system to be set up to compare the use counter with the least one threshold value and, if this threshold value is exceeded by the use counter, not to allow any further uses of the associated capability characteristic and/or the group of capability characteristics.

Furthermore, for the form of embodiment of the invention just mentioned it is of advantage if the switching system is designed to compare the threshold value with a capacity value that specifies the physically maximum possible use number of at least one capability characteristic which is subject to a license and/or at least one group of capability characteristics which is subject to a license.

Preferably the switching system is arranged to generate the current value of the use counter and/or information about the capability characteristic assigned to the use counter and/or the group of capability characteristics assigned to the use counter in the form of data. If at least one capability characteristic subject to a license or at least one group of capability characteristics subject to a license are released without restriction, license monitoring can be undertaken on the basis of periodic spot checks; for this purpose the switching system is designed to buffer the data at specified intervals.

To facilitate the further analysis of the data, the switching system is arranged to generate a data table from the data.

Advantageously the switching system is arranged in such a way as to transfer the data onto an external storage medium.

For convenience the exchange is arranged to transmit the stored data to a telecommunications terminal over a data connection.

BRIEF DESCRIPTION OF THE DRAWINGS

Further features and advantages of the invention are disclosed in the following description of the exemplary embodiments, with reference to the drawings in which.

DETAILED DESCRIPTION OF THE PREFERRED EMBODIMENTS

Figures 1, 2:
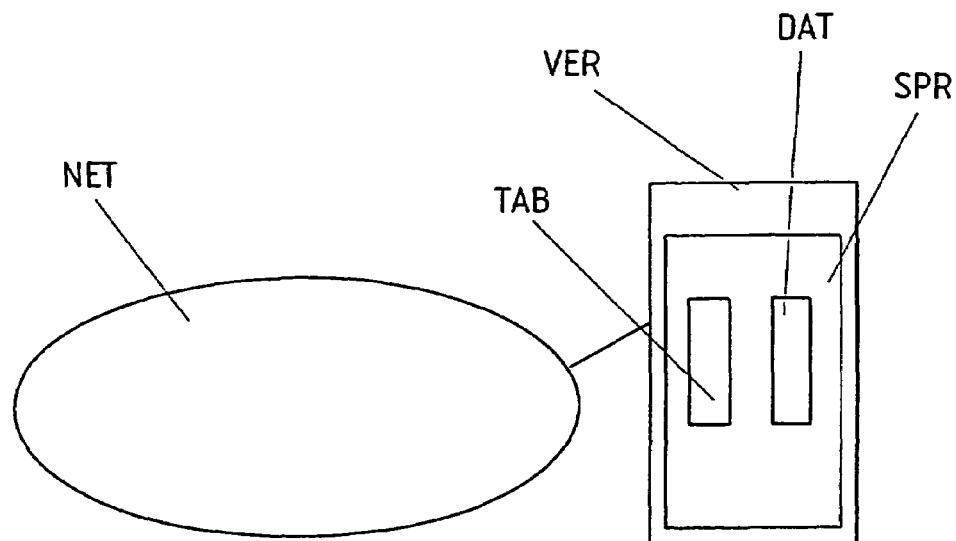
FIG. 1. shows a telecommunications network with a first variant of a switching system used in conjunction with the invention.
FIG. 2. shows a first variants of a data table created in conjunction with the invention with capability characteristics and their assigned counters.

In accordance with FIG. 1, an Exchange VER used in conjunction with the invention preferably features a memory SPR in which there is provision for a database DAT which can contain the data of all subscribers, network operators, exchange operators and capability characteristics. Advantageously, the database DAT may be based on a semi-permanent database, i.e. it may have a backup copy on a hard disk of the switching system VER to allow it to be restored if necessary, but can be changed during ongoing operation.

Each capability characteristic subject to a license can be assigned the use counter in the exchange VER. This counter specifies the current number of uses of a licensed capability characteristic or of a licensed group of capability characteristics by an exchange operator.

For concurrent license monitoring, the number of current uses of a capability characteristic subject to a license and, as described in more detail below, further information, for example in the form of the table TAB, may be included.

In accordance with FIG. 2, each capability characteristic F1, F2, F3 in the table TAB may be assigned a use counter C. This counter preferably specifies the current number of uses of a licensed capability characteristic F1, F2, F3 or of the group G1, G2, G3 of capability characteristics F1, F2, F3 by an exchange operator.

The creation, i.e. making a capability characteristic F1, F2, F3 usable for a subscriber or a network operator is subject to a license, but not the actual use in a sense of a use of capability characteristic F1, F2, F3 or group G1, G2, G3 of capability characteristics F1, F2, F3 by a subscriber or network operator. The current number of uses of a capability characteristic F1, F2, F3 or group G1, G2, G3 of capability characteristics F1, F2, F3 is thus taken to mean in this document the number of created, i.e. usable capability characteristics F1, F2, F3 or groups G1, G2, G3 of capability characteristics F1, F2, F3.

The actual use of these capability characteristics F1, F2, F3 or groups G1, G2, G3 of capability characteristics F1, F2, F3 by subscribers or network operators is preferably, by contrast, not recorded.

In other words, the use counter C specifies the number of created capability characteristics F1, F2, F3 which is subject to a license in the switching system VER.

The obvious choice is to group service features F1, F2, F3 which have already found a high level of market acceptance and in many markets have almost or actually become standard capability characteristics, such as the "Standard" or "Komfort" ISDN service features offered by Deutsche Telekom, into groups G1, G2, G3. New or very complex capability characteristics F1, F2, F3, which are only offered individually on the market, are licensed as individual capability characteristics F1, F2, F3.

If a subscriber or a network operator wishes to use a capability characteristic F1, F2, F3, it is usually necessary to create this capability characteristic F1, F2, F3 in the switching system of the Telecommunications Network to which the subscriber belongs for this subscriber or network operator. The request to create this subscriber capability characteristic F1, F2, F3 is usually made by a corresponding application on the part of the subscriber or network operator. This application can be made in writing to the switching system operator who then undertakes to create the corresponding capability characteristic F1, F2, F3.

To create a capability characteristic F1, F2, F3 for a subscriber or a network operator, a special command can be provided by the exchange operator, for example "CREATE". Likewise, to delete a capability characteristic F1, F2, F3 for a subscriber, a command, for example "DELETE", can be provided on the exchange operator side.

Typically, as already explained above, the subscriber and network operator data are stored in a database of the switching system.

A command to create a capability characteristic F1, F2, F3 or a group G1, G2, G3 of capability characteristics F1, F2, F3 for a subscriber or network operator causes a corresponding entry to be made in the area of the database that is assigned to this subscriber or network operator, for example in the form of a variable which is assigned to a specific capability characteristic F1, F2, F3 or a group G1, G2, G3 of capability characteristics F1, F2, F3.

The use counter C mentioned above can adjust itself automatically in the exchange VER. Each create a command that allocates a capability characteristic F1, F2, F3 to a subscriber or a network operator increments the use counter C of the corresponding capability characteristic F1, F2, F3 or of the group G1, G2, G3 of capability characteristics F1, F2, F3. Each deletion command that deletes a capability characteristic F1, F2, F3 for a subscriber or network operator again decrements the use counter C accordingly. To implement the incrementation or decrementation of use counter C, a program can be provided that is started by the deletion or creation command.

Each capability characteristic F1, F2, F3 can be assigned further values or counters.

Thus a capacity value A gives the maximum usable number of the relevant capability characteristic F1, F2, F3 which is produced from the current memory and database configuration of the exchange. The capacity value A is computed automatically by the exchange in accordance with the current memory and database configuration and automatically adjusts itself after memory or database expansions during operation. This capacity value A is designated as the capacity threshold and basically functions as a threshold value for the service personnel to define the maximum extent of any increase in the number of licensed capability characteristics F undertaken during operation, before the memory or database has to be expanded.

The capacity value A can be obtained as the result of a generation run of an office data generation program used in the relevant exchange. These types of programs are normally used to calculate the available memory capacity for switching systems and are known to experts.

The threshold value B specifies the maximum licensed use number of the relevant capability characteristic F for the exchange operator. This threshold value represents a license threshold for capability characteristic F. When the value of use counter C exceeds this license threshold any further creation command for this capability characteristic F is rejected. When the license threshold is reached in the capability characteristic use further capacity can be obtained for customers by deleting capability characteristics F1, F2, F3 or groups G1, G2, G3 of capability characteristics to enable these capability characteristics F to be assigned to other customers. If the demand for capability characteristics F1, F2, F3 is so great that not enough new capacity can be created to satisfy demand for customers by removing created capability characteristics F1, F2, F3, the exchange operator must have the license increased by the manufacturer.

Threshold values B can be advantageously modified from the manufacturer's side. Such changes can be made during operation by the service personnel of the manufacturer in accordance with the license scope negotiated with the relevant exchange operator.

To avoid misuse by the exchange operator or third parties, the modifications can be made under password protection. This typically involves using passwords that dynamically/automatically change in accordance with an algorithm known on the manufacturer side. The capacity value A, which specifies the physically maximum usable number of a capability characteristic as well as the threshold value B and use counter C are, like the database mentioned at the beginning, semi-permanent.

The following relationship can be established between the use counter C, the threshold value B and the capacity value A: A>=B>=C.

For an expanded use of the invention within the framework of the reseller concept mentioned there are two further semi-permanent values/counters—a further threshold value D1, D2 and a further use counter E1, E2, provided for each exchange operator occurring in the exchange.

The further threshold value D1, D2 specifies the maximum number of licensed uses of a capability characteristic F by a reseller in respect of a further exchange operator and thus corresponds to a license threshold set by reseller. Any further threshold value D1, D2 can, for example, be modified on the part of a manufacturer or the reseller. Changes can be made in ongoing operation by the relevant service personnel in accordance with the license scope negotiated with the relevant exchange operator.

The further use counter E1, E2 preferably specifies the number of capability characteristics F1, F2, F3 actually used by the relevant exchange operator. The further use counter E1, E2 can automatically adjust itself for use/creation of a capability characteristic F1, F2, F3 for a customer of an exchange operator in exchange system.

In the case of reseller who provides a number of exchange operators with capability characteristics F1, F2, F3, the use counter C for one of these capability characteristics F1, F2, F3 corresponds to the sum of the further use counter E1, E2 which are assigned to this capability characteristic.

In general, the following relationships between the individual counters or values can be established $$A \geq B \geq \sum_{n=1}^{i} D_n \geq \sum_{n=1}^{i} E_n$$

and $D_n \geq E_n$ for n=1, 2, . . .

In which A is the capacity value described above, E is the threshold value for the maximum use number, $D_n$ is the relevant reseller license threshold for a specified number of further exchange operators and $E_n$ is the reseller use counter belonging to the individual reseller or license thresholds. Each command to create a capability characteristic F1, F2, F3 for a customer of an exchange operator increments use counters C, E1, E2 of the relevant capability characteristic F1, F2, A3 or of the group G of capability characteristics F1, F2, F3. When the counter status of the further use counter E1, E2 exceeds the reseller license threshold D, the corresponding command is rejected. Each command to delete a capability characteristic for a customer decrements the reseller use counters E1, E2 accordingly.

When the license threshold of a reseller is reached in the use of a capability characteristic, further capacity can be obtained by deleting those capability characteristics of this reseller to enable these capability characteristics F1, F2, F3 to be assigned to other customers of the same reseller. If necessary, the reseller must have the licenses increased by the exchange operator.

Figures 3, 4:
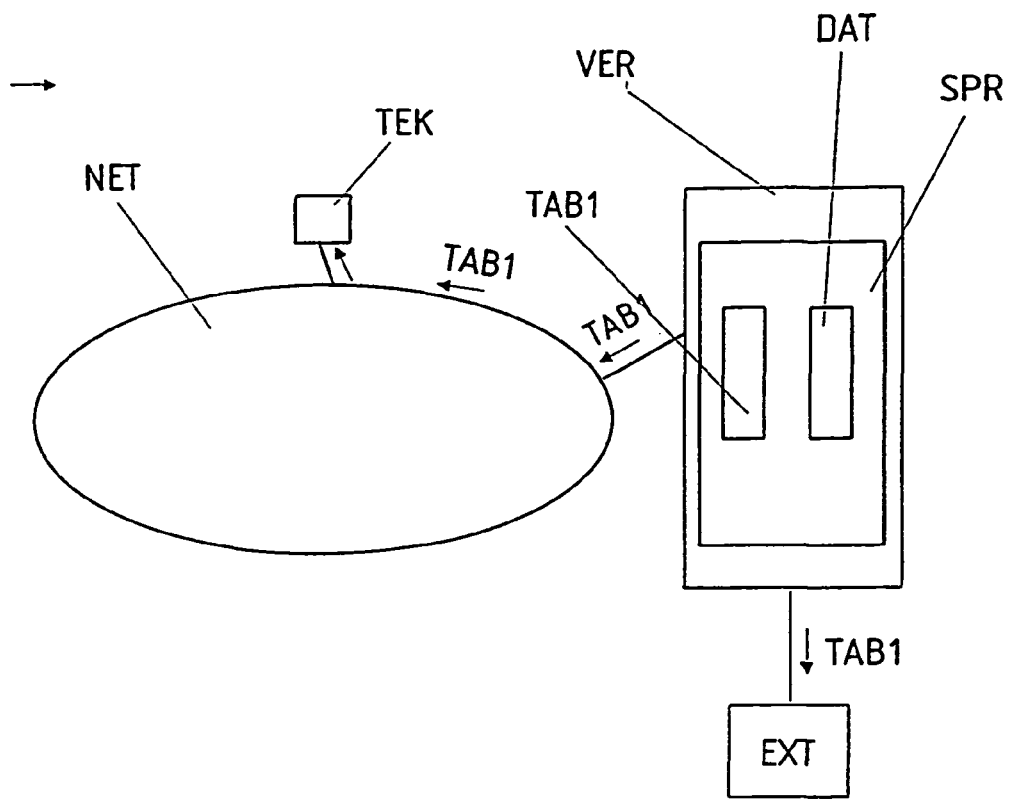
FIG. 3. shows the telecommunications network from FIG. 1 with a telecommunications terminal and a second variant of a switching system used in conjunction with the invention.
FIG. 4. shows a second variant of the data table from FIG. 2.

Another embodiment of the invention in accordance with FIG. 3 consists of all capability characteristics F1, F2, F3 being enabled without restriction of license monitoring and being undertaken on the basis of periodical spot checks or memory dumps of switching system VER. In this case the license threshold of a capability characteristic F1, F2, F3 is the same as the capacity value A which defines the physically maximum possible number of uses of this capability characteristic F1, F2, F3.

If all capability characteristics F1, F2, F3 are enabled without restriction, further capacity can be obtained for customers, as with the concurrent license monitoring mentioned above, by deleting capability characteristics F1, F2, F3, in order to assign these capability characteristics F1, F2, F3 to other customers.

License monitoring on the basis of periodic spot checks is based on the fact that a data collector on request or at specified intervals searches through the semi-permanent database of the data bank of an exchange system VER for created capability characteristics F1, F2, F3. This data collector can be implemented in the form of a program that records all the network operators, subscribers and exchange operators that occur within the exchange. Furthermore, the data collector explicitly knows all capability characteristics F1, F2, F3, that are implemented within the exchange. In the data collector, each capability characteristic F1, F2, F3 is represented by separate use counter C or, in case of a number of exchange operators, by a further use counter E, which specifies the number of current uses, i.e. the created capability characteristics F1, F2, F3 or the groups G1, G2, G3 of capability characteristics F1, F2, F3.

It is useful to collect the results of this database evaluation in a data table TAB1, of which an example is shown in FIG. 4, within the exchange. In this data table TAB1, each capability characteristic is represented by its use counters or its further use counters E1, E2. After complete evaluation of the database, this data table TAB1 contains the complete information about all capability characteristics of switching system VER used at the time that the data was dumped.

Data table TAB1 can be extracted for further evaluation onto an external storage medium EXT or transmitted via a data link to other telecommunications systems TEK, for example a computer. The number of uses determined from data table TAB1, the capability characteristics F1, F2, F3 subject to a license or the groups G1, G2, G3 of capability characteristics F1, F2, F3 subject to a license then form the basis for calculating the license fees. Data table TAB1, in a manner of speaking, represents a snapshot of the capability characteristics F1, F2, F3 of the exchange VER which is subject to a license. The frequency with which this data table TAB1 is created and is extracted from exchange by the manufacturer is basically subject to an agreement between the exchange operator(s) and the manufacturer. The procedure just described for monitoring capability characteristics F1, F2, F3 which are subject to a license is based on the practical assumption that the number of created capability characteristics F1, F2, F3 remains approximately constant in the period between two data dumps.

An advantage of the invention is that capability characteristics F which is subject to a license are billed in the switching systems in accordance with their actual use.

The invention claimed is:

1. A method for managing at least one capability characteristic or at least one group of capability characteristics which is subject to a license of a switching system of a telecommunications network, comprising:
assigning at least one use counter which specifies the current number of created capability characteristics or the group of created capability characteristics to the at least one capability characteristic, which is subject to a license, and/or to the at least one group of capability characteristics, which is subject to a license.

2. The method according to claim 1, wherein the use counter is compared with at least one threshold value and if this threshold value is exceeded, no further uses of this capability characteristic and/or the group of capability characteristics are allowed.

3. The method according to claim 2,
wherein the threshold value is compared with a capacity value which specifies the physically maximum possible use number of the capability characteristic and/or the group of capability characteristics in the switching system.

4. The method according to claim 1,
wherein the current value of the use counter and/or information about the capability characteristics assigned to the use counter and/or the group of capability characteristics assigned to the use counter within the switching system is created in the form of data.

5. The method according to claim 4,
wherein the data is buffered within the switching system at specifiable intervals.

6. The method according to claim 4 wherein a data table is created from the data.

7. The method according to claim 4,
wherein the data is dumped onto an external storage medium.

8. The method according to claim 4,
wherein the data is exchanged between the switching system and a telecommunications terminal over a data link.

9. A switching system of a telecommunications network, in which at least one capability characteristic or at least one group of capability characteristics, which is subject to a license, is implemented in the switching system and the switching system is arranged to manage at least one capability characteristic or at least one group of capability characteristics, wherein the at least one capability characteristic, which is subject to a license, and/or the at least one group of capability characteristics, which is subject to a license, is assigned at least one incrementable and decrementable use counter in the switching system which specifies the current number of created capability characteristic, which are subject to a license, or the group of created capability characteristics, which is subject to a license.

10. The switching system according to claim 9,
wherein the switching system is arranged to compare the use counter to at least one threshold value, and when this threshold value is exceeded by the use counter, no further uses of this capability characteristic and/or the group of capability characteristics are allowed.

11. The switching system according to claim 10,
wherein the switching system is arranged to compare the threshold value to a capacity value which specifies the physically maximum possible use number of the capability characteristic and/or the group of capability characteristics.

12. The switching system according to claim 9,
wherein the switching system is arranged to create a current value of the use counter and/or information about the capability characteristics assigned to the use counter and/or the group of capability characteristics assigned to the use counter in the form of data.

13. The switching system according to claim 12
wherein the switching system is arranged to buffer the data at specified intervals.

14. The switching system according to claim 12,
wherein the switching system is arranged to create a data table from the data.

15. The switching system according to claim 12,
wherein the switching system is arranged to transfer the data onto an external storage medium.

16. The switching system according to claim 12,
wherein the switching system is arranged to transfer the buffered data to a telecommunications terminal via a data link.

* * * * *